(12) United States Patent
Povey

(10) Patent No.: US 10,403,151 B2
(45) Date of Patent: Sep. 3, 2019

(54) TRAFFIC SYSTEM HAVING CONGESTION MANAGEMENT

(71) Applicant: Caterpillar Inc., Peoria, IL (US)

(72) Inventor: Dean G. Povey, Queensland (AU)

(73) Assignee: Caterpillar Inc., Deerfield, IL (US)

( * ) Notice: Subject to any disclaimer, the term of this patent is extended or adjusted under 35 U.S.C. 154(b) by 656 days.

(21) Appl. No.: 15/014,926

(22) Filed: Feb. 3, 2016

(65) Prior Publication Data

US 2017/0221354 A1    Aug. 3, 2017

(51) Int. Cl.
| | | |
|---|---|---|
| *G08G 1/00* | (2006.01) | |
| *G08G 1/01* | (2006.01) | |
| *H04L 29/08* | (2006.01) | |
| *G05D 1/02* | (2006.01) | |

(52) U.S. Cl.
CPC .......... *G08G 1/207* (2013.01); *G05D 1/0217* (2013.01); *G05D 1/0274* (2013.01); *G05D 1/0297* (2013.01); *G08G 1/00* (2013.01); *G08G 1/0112* (2013.01); *G08G 1/0133* (2013.01); *G08G 1/20* (2013.01); *H04L 67/00* (2013.01); *H04L 67/025* (2013.01); *G05D 2201/0202* (2013.01)

(58) Field of Classification Search
None
See application file for complete search history.

(56) References Cited

U.S. PATENT DOCUMENTS

| | | | | |
|---|---|---|---|---|
| 5,999,865 A | * | 12/1999 | Bloomquist | ......... G05D 1/0248 299/1.05 |
| 7,756,615 B2 | * | 7/2010 | Barfoot | ................ G05D 1/0297 180/168 |
| 8,825,350 B1 | | 9/2014 | Robinson | |
| 9,117,098 B2 | | 8/2015 | Trombley et al. | |

(Continued)

FOREIGN PATENT DOCUMENTS

| | | | | |
|---|---|---|---|---|
| FR | 3035961 A1 | * | 11/2016 | ........... G05D 1/0217 |
| GB | 2237905 A | * | 5/1991 | ............. G01C 21/32 |

(Continued)

OTHER PUBLICATIONS

Translation for JP 4481235 (Year: 2005).*

*Primary Examiner* — Christian Chace
*Assistant Examiner* — Michael F Whalen
(74) *Attorney, Agent, or Firm* — Finnegan, Henderson, Farabow, Garrett & Dunner, LLP

(57) ABSTRACT

A traffic system is disclosed for use with a plurality of mobile machines. The traffic system may have a locating device configured to generate a location signal indicative of a location of each of the plurality of mobile machines, and an onboard controller configured to regulate operation of each of the plurality of mobile machines based on the location signal. The traffic system may also have a communication device, and a worksite controller in communication with the locating device and onboard controller via the communication device. The worksite controller may be configured to calculate a directed graph of the worksite (Continued)

based on the location signal and known routes for each of the plurality of mobile machines. The worksite controller may also be configured to determine a congestion metric based on the directed graph, and to selectively command the onboard controller to implement a responsive operation based on the congestion metric.

8 Claims, 5 Drawing Sheets

(56) References Cited

U.S. PATENT DOCUMENTS

| | | | |
|---|---|---|---|
| 2007/0239338 A1* | 10/2007 | Potts | E01C 19/288 |
| | | | 701/50 |
| 2012/0330540 A1* | 12/2012 | Ozaki | G06Q 10/047 |
| | | | 701/117 |
| 2013/0024112 A1* | 1/2013 | Tate, Jr. | B60L 11/1862 |
| | | | 701/439 |
| 2013/0054133 A1* | 2/2013 | Lewis | G01C 21/3407 |
| | | | 701/423 |
| 2014/0067265 A1 | 3/2014 | Maston | |
| 2015/0153180 A1* | 6/2015 | Ettinger | G01C 21/206 |
| | | | 701/410 |
| 2015/0179062 A1* | 6/2015 | Ralston | G01C 21/26 |
| | | | 701/117 |
| 2018/0252548 A1* | 9/2018 | Saito | G01C 21/3694 |

FOREIGN PATENT DOCUMENTS

| | | | |
|---|---|---|---|
| JP | 2007128121 A | * | 5/2007 |
| JP | 6186319 B2 | * | 8/2017 |
| WO | WO 2014/186359 | | 11/2014 |
| WO | WO 2015/045695 | | 4/2015 |

* cited by examiner

TRAFFIC SYSTEM HAVING CONGESTION MANAGEMENT

TECHNICAL FIELD

The present disclosure is directed to a traffic system and, more particularly, to a traffic system having congestion management.

BACKGROUND

Multiple machines (e.g., haul trucks, motor graders, water trucks, and other large equipment) often operate simultaneously at a common worksite. These machines move in close proximity to each other, using portions of the same travel routes and other resources (e.g., loading, dumping, and service resources). As a result, traffic congestion can become a problem. Specifically, when too many machines are vying for the same resources in an uncoordinated or poorly coordinated manner, inefficient delays and deadlock can result. This may be particularly true when the machines are autonomously or remotely controlled.

One attempt at congestion control of autonomous vehicles is disclosed in U.S. Patent Publication 2015/0179062 of Ralston et al. that published on Jun. 25, 2015 ("the '062 publication"). Specifically, the '062 publication discloses a dynamic routing system having a plurality of land buoys, each proximately disposed to one or more different segments of a travel route. The land buoys gather situational awareness information about the route segments via sensors and cameras mounted on the land buoys, or directly from vehicles traveling on the road segments. The situational awareness information can include traffic density and obstructions. The situational awareness information gathered by each land buoy is communicated to a central server, which processes the information. Processing of the information can include weighting and normalization to produce traffic impedance scores for each of the road segments. The impedance scores represent the burden, difficulty, and/or desirability of a particular road segment, and vary between +1 and −1. The impedance scores are transmitted from the central server back to the land buoys, and from the land buoys to the autonomous vehicles for use in navigation and control of the vehicles.

Although the system of the '062 publication may be helpful in some on-highway vehicular applications, its application and benefit may be limited and costly. In particular, the system may only be useful along road segments equipped with the land buoys; and placement and maintenance of multiple land buoys can be difficult and expensive. Further, because the system may not have assigned routing information for each of the vehicles traveling on the road segments, the system may have limited success in anticipating or quantifying congestion.

The disclosed traffic system is directed to overcoming one or more of the problems set forth above and/or other problems of the prior art.

SUMMARY

One aspect of the present disclosure is directed to a traffic system for use with a plurality of mobile machines at a worksite. The traffic system may include a locating device positioned onboard each of the plurality of mobile machines and configured to generate a location signal indicative of a location of each of the plurality of mobile machines at the worksite, and an onboard controller positioned onboard each of the plurality of mobile machines and configured to regulate operation of each of the plurality of mobile machines based on the location signal. The traffic system may also include a communication device positioned onboard each of the plurality of mobile machines, and a worksite controller in communication with the locating device and the onboard controller via the communication device. The worksite controller may be configured to calculate a directed graph of the worksite based on the location signal and known route assignments for each of the plurality of mobile machines. The worksite controller may also be configured to determine a congestion metric based on the directed graph, and to selectively command the onboard controller to implement a responsive operation based on the congestion metric.

Another aspect of the present disclosure is directed to a method for controlling a plurality of mobile machines operating at a worksite. The method may include generating location signals indicative of locations of the plurality of mobile machines, and calculating a directed graph of the worksite based on the location signals and known route assignments for each of the plurality of mobile machines. The method may also include determining a congestion metric based on the directed graph, and selectively implementing a responsive operation based on the congestion metric.

Yet another aspect of the present disclosure is directed to a non-transitory computer readable medium containing computer-executable programming instructions for performing a method of congestion control. The method may include generating location signals indicative of locations of a plurality of mobile machines, and calculating a directed graph of a worksite based on the location signals and known route assignments for each of the plurality of mobile machines. The method may also include determining a congestion metric based on the directed graph, and selectively implementing a responsive operation based on the congestion metric.

DETAILED DESCRIPTION

Figure 1:
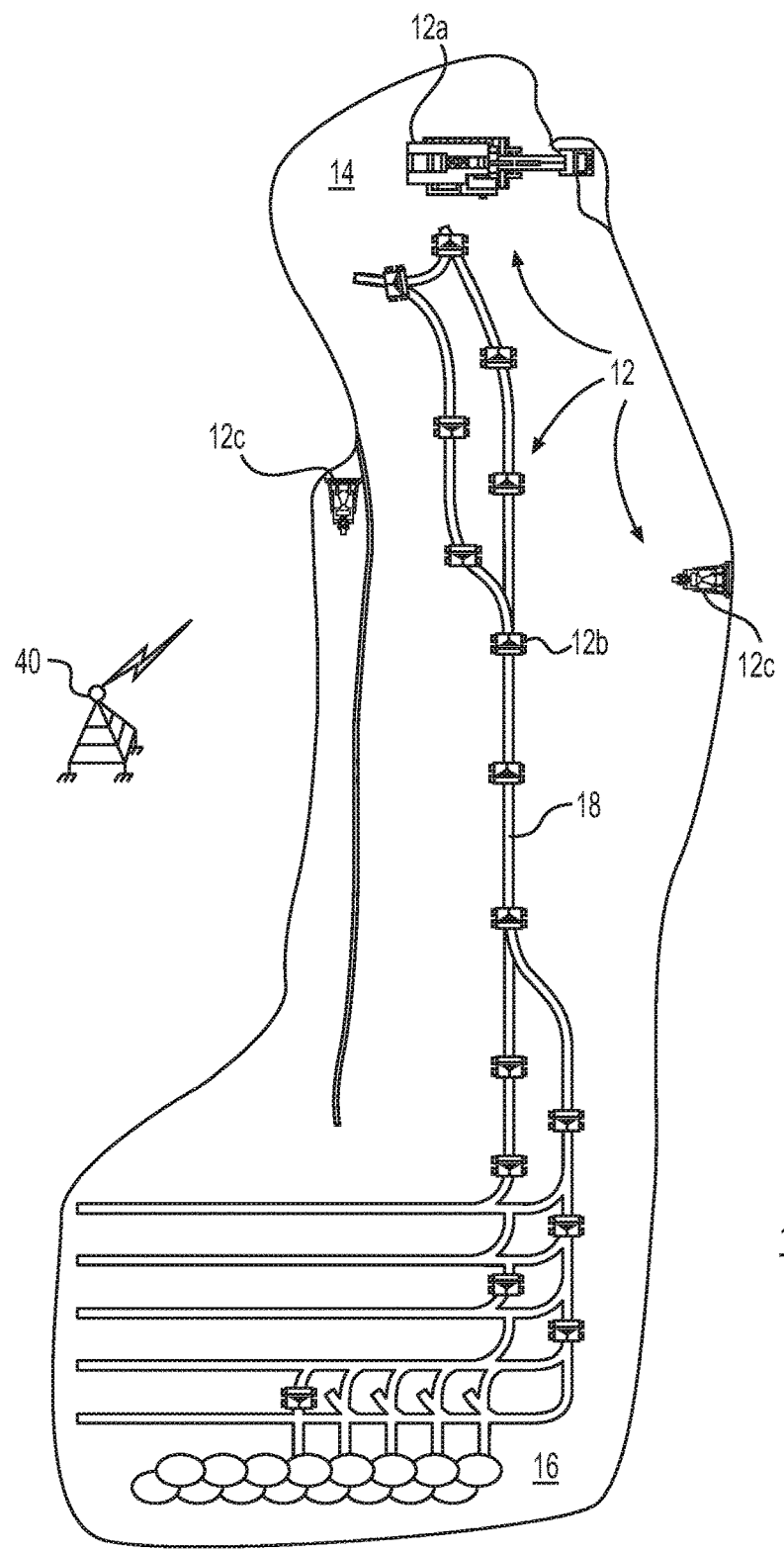
FIG. 1 is a diagrammatic illustration of an exemplary disclosed worksite.

FIG. 1 illustrates an exemplary worksite 10 with a plurality of mobile machines 12 performing different tasks at various locations of worksite 10. Worksite 10 may include, for example, a mine site, a landfill, a quarry, a construction site, a road worksite, or any other type of worksite. The tasks may be associated with any work activity appropriate at worksite 10, and may require machines 12 to generally traverse worksite 10.

Figure 2:
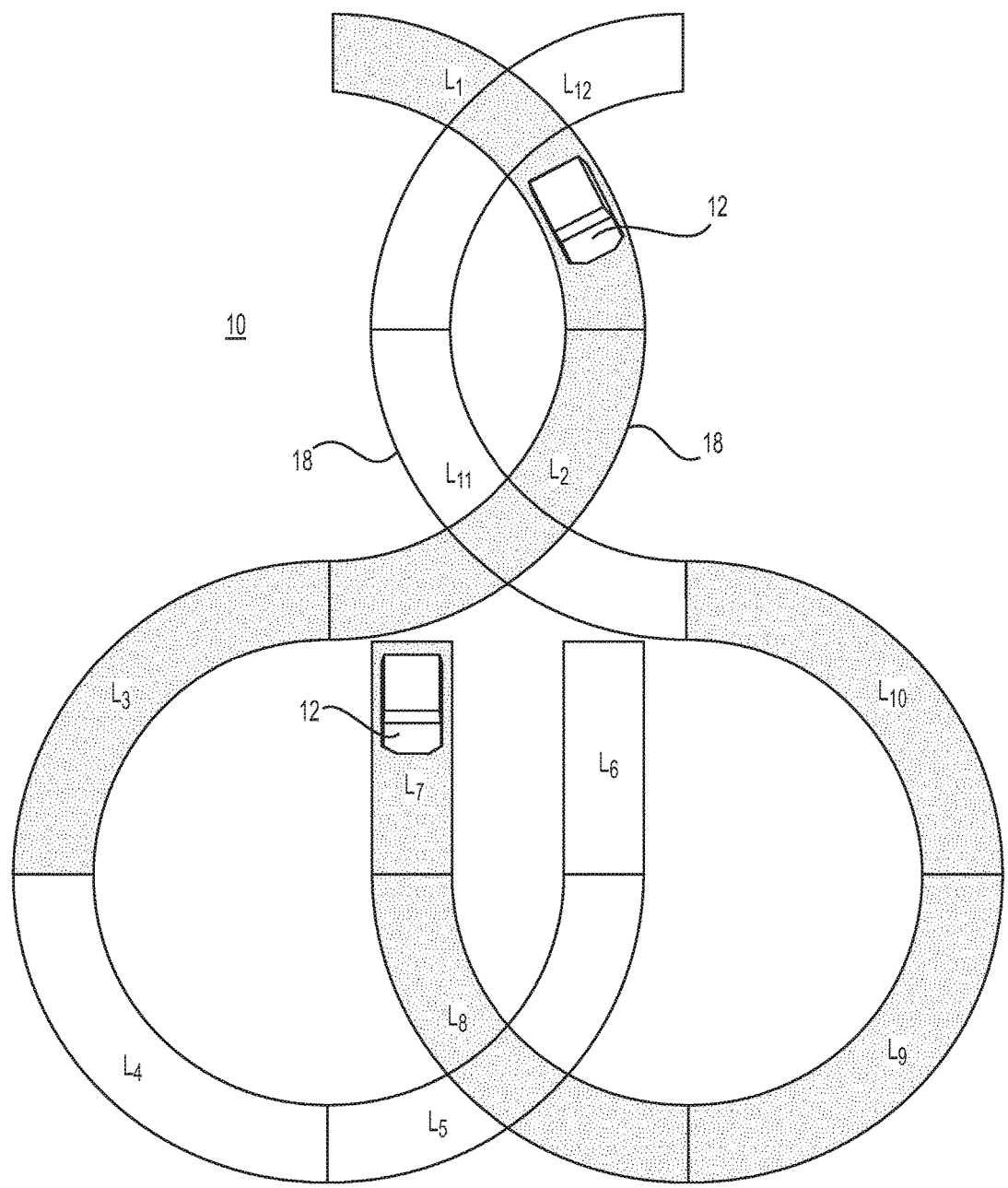
FIG. 2 is a virtual representation of a portion of the worksite of FIG. 1.

Worksite 10 may include multiple locations designated for particular purposes. For example, a first location 14 may be designated as a load location, while a second location 16 may be designated as a dump location. One or more travel routes 18 may generally extend between load location 14 and dump location 16. As shown in FIG. 2, each travel route 18 may be divided into multiple segments or lanes (labeled as $L_1, L_2, \ldots L_n$) that, if followed sequentially by a particular machine 12, will lead that machine 12 from its current location to its desired location at load location 14, dump location 16, or another resource location of worksite 10. The lanes may be assembled into unique travel routes 18 for each machine 12 and, as will be described in more detail below, structuring of the assemblies may aid in regulating the movements of machines 12 at worksite 10.

Any number and types of machines 12 may simultaneously and cooperatively operate at worksite 10. For example, a first type of machine (e.g., an excavator shown in FIG. 1) 12a may be stationed at load location 14 and assigned to fill a second type of machine (e.g., a haul truck) 12b with material. A third type of machine (e.g., a dozer, a motor grader, a water truck, and/or a service vehicle) 12c may be tasked with traveling up and down travel route 18 to condition travel routes 18, to clean up load and/or dump locations 14, 16, and/or to service other machines 12 at any location of worksite 10. Machines 12 may be self-directed machines configured to autonomously traverse the changing terrain of worksite 10, manned machines configured to traverse worksite 10 under the control of a local or remote operator, or hybrid machines configured to perform some functions autonomously and other functions under the control of an operator.

Figure 3:
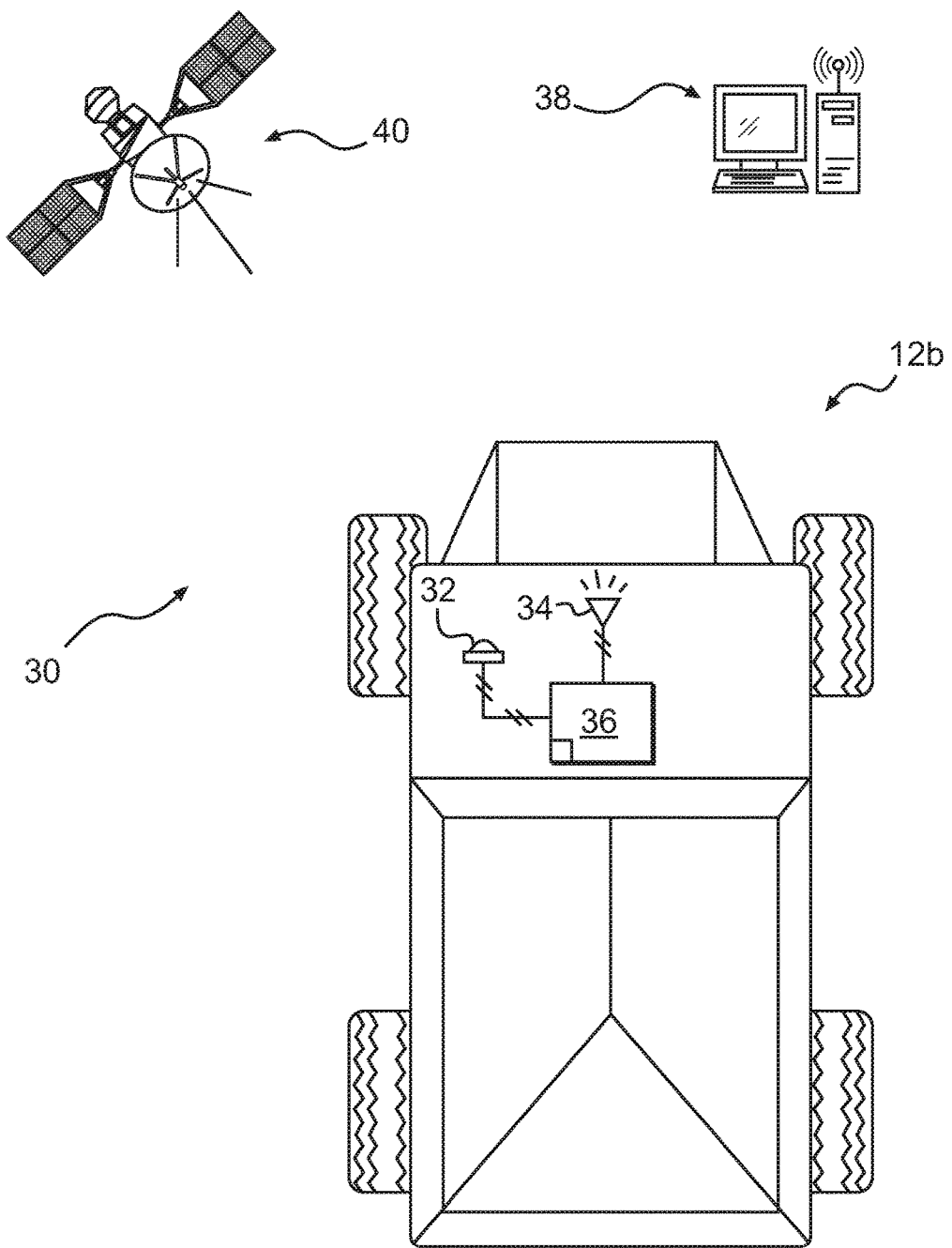
FIG. 3 is a diagrammatic illustration of an exemplary disclosed control system that may be used to manage traffic at the worksite of FIG. 1.

As shown in FIG. 3, each machine 12 (a haul truck is shown by way of example only) may be equipped with components of a system 30 that facilitate traffic (e.g., congestion) management at worksite 10. System 30 may include, among other things, a locating device 32, a communication device 34, and an onboard controller 36 connected with each of locating device 32 and communication device 34. System 30 may additionally include an offboard or worksite controller 38 that is capable of communication with each onboard controller 36 via corresponding communication devices 34.

As each machine 12 travels about worksite 10, a Global Navigation Satellite System (GNSS) or other tracking device or system 40 may communicate with locating device 32 to monitor the movements of machine 12 and generate corresponding location signals. The location signals may be directed to onboard controller 36 and/or worksite controller 38 for comparison with an electronic map of worksite 10 and for further processing. The further processing may include, among other things, determining a current location of each machine 12; a distance between machines 12; boundaries of the lanes; speeds of machines 12; and/or projected or assigned travel routes 18 of machines 12.

Communication device 34 may facilitate communication between onboard controllers 36 and/or between onboard controllers 36 and worksite controller 38. This communication may include, for example, the coordinates, speeds, and/or travel routes 18 of machines 12 generated based on signals from locating device 32. The communication may also include notification of lane boundaries, and/or identification of particular lanes that have been authorized for use by certain machines 12. Data messages associated with system 30 may be sent and received via a wireless communication link. The wireless communications may include satellite, cellular, infrared, and any other type of wireless communications that enable communication device 34 to exchange information between worksite controller 38 and onboard controllers 36.

Onboard controller 36 may embody a single microprocessor or multiple microprocessors that include a means for monitoring, processing, recording, indexing, and/or communicating the location signal, and for selectively and responsively controlling operations of the associated machine 12. For example, onboard controller 36 may include a storage device, a clock, and a processor, such as a central processing unit or any other means for accomplishing a task consistent with the present disclosure. Numerous commercially available microprocessors can be configured to perform the functions of onboard controller 36. It should be appreciated that onboard controller 36 could readily embody a general machine controller capable of controlling numerous other machine functions. Various other known circuits may be associated with onboard controller 36, including signal-conditioning circuitry, communication circuitry, and other appropriate circuitry.

Worksite controller 38 may include any means for monitoring, recording, storing, indexing, processing, and/or communicating various operational aspects of worksite 10 and machines 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 4:
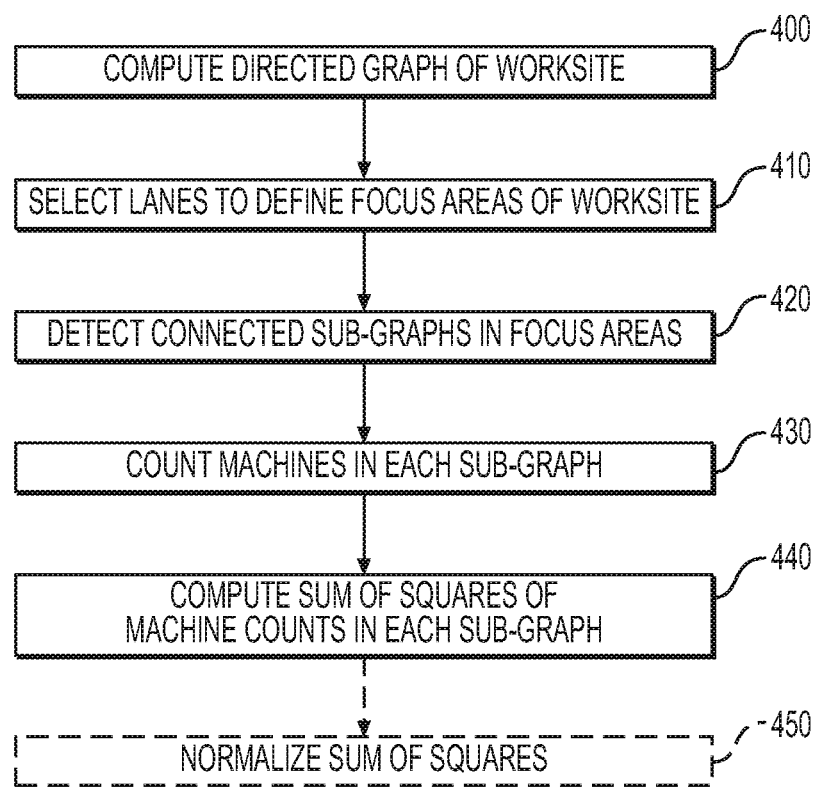
FIG. 4 is a flowchart depicting an exemplary disclosed traffic control method that may be implemented by the system of FIG. 2.

Worksite controller 38 may be configured to execute instructions stored on computer readable medium to perform methods of traffic control at worksite 10. FIG. 4 illustrates one example of these methods. FIG. 4 will be described in more detail in the following section to further illustrate the disclosed concepts.

As will be described below with regard to FIG. 4, worksite controller 38 may generate a "directed graph" of worksite 10 during execution of the stored instructions. A directed graph represents a network of relationships between specific objects. In the disclosed exemplary directed graph of FIG. 5, the specific objects being represented are machines 12 (labeled as $m_1$-$m_{17}$) and the lanes (shown as stars with corresponding labels $L_1$-$L_{18}$) that make up the routes 18 travelled by machines 12. In the directed graph of FIG. 5, three types of relationships are represented by arrows (a.k.a., edges in directed graph theory) having three different line patterns. Specifically, when a particular machine 12 has permission to travel along a particular lane in its assigned route 18, a solid arrow is shown extending from that machine 12 to the star representing the particular lane. Similarly, when a particular machine 12 is blocking other machines 12 from travel to a particular lane (e.g., by being located in that particular lane), a dashed arrow is shown extending from that particular machine 12 to the star representing the particular lane. Finally, when a particular machine 12 is waiting for permission to enter a particular lane (e.g., waiting for another machine 12 to leave the particular lane), a dotted arrow is shown extending from that particular machine 12 to the star representing the particular lane. A grouping of nodes made up of machines 12 and the lanes of routes 18 that are connected to each other via arrows is said to be a connected sub-graph of the directed graph. Accordingly, a directed graph may have one or more separate connected sub-graphs (i.e., groupings of connected machine and lane nodes, which are disconnected from the other groupings).

Figure 5:
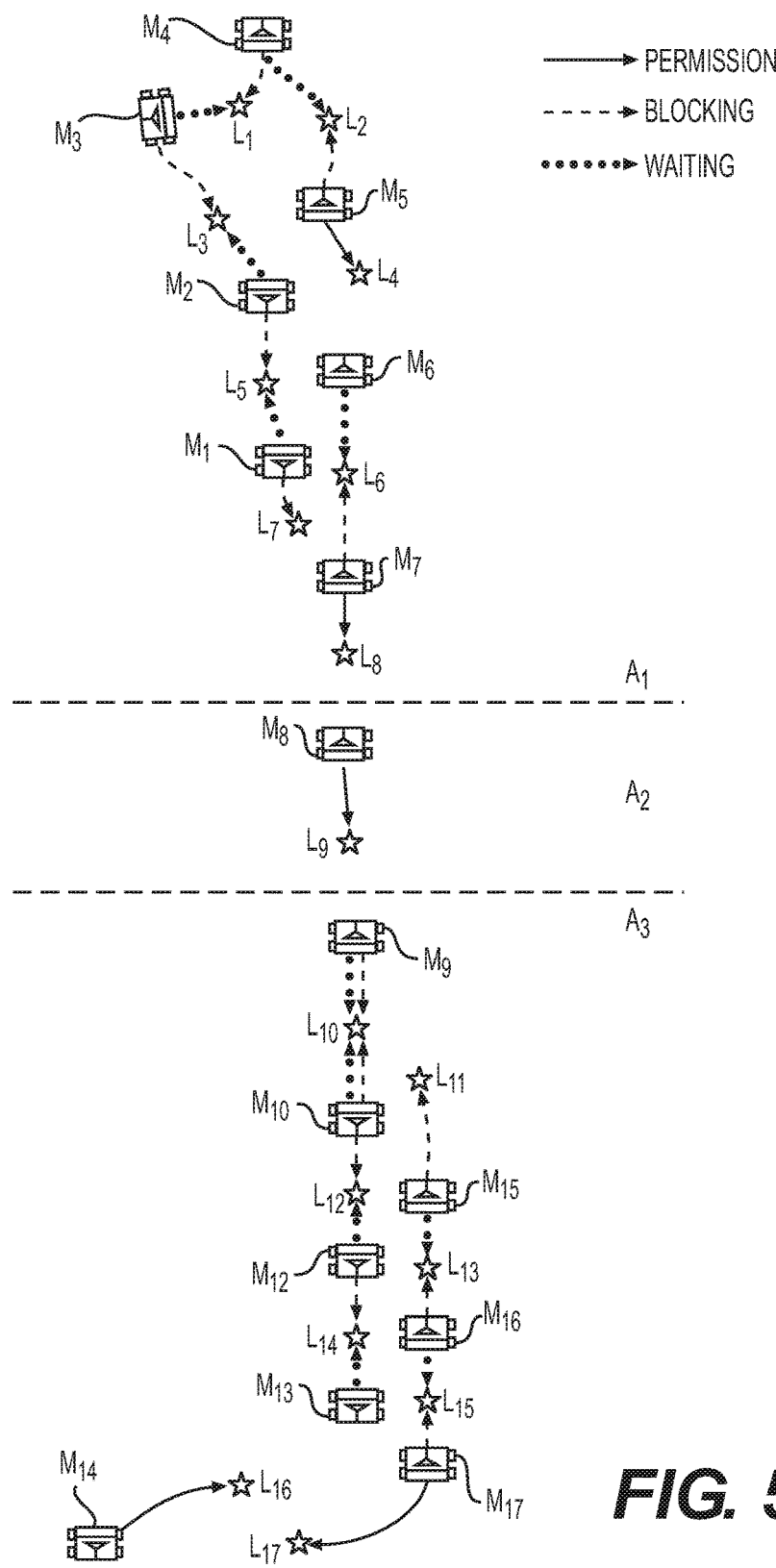
FIG. 5 is a graphical representation of a portion of the worksite of FIG. 1.

The exemplary directed graph of FIG. 5 is divided into three areas (e.g., area $A_1$, area $A_2$, and area $A_3$). Area $A_1$ is associated with load location 14; area $A_3$ is associated with dump location 16; and area $A_2$ is shown as being located between areas $A_1$ and $A_3$. Area $A_1$ contains a first connected sub-graph consisting of machines 12 labeled $m_1$-$m_5$ and lanes $L_1$-$L_6$, and a second connected sub-graph consisting of machines 12 labeled $m_6$-$m_7$ and lanes $L_7$-$L_8$. Area $A_2$ contains a single connected sub-graph consisting of machine 12 labeled $m_8$ and lane $L_9$. Area $A_3$ contains a first connected sub-graph consisting of machines 12 labeled $m_9$-$m_{13}$ and lanes $L_{10}$-$L_{14}$, a second connected sub-graph consisting of machine 12 labeled $m_{14}$ and lane $L_{14}$, and a third connected sub-graph consisting of machines 12 labeled $m_{15}$-$m_{17}$ and lanes $L_{15}$-$L_{18}$.

INDUSTRIAL APPLICABILITY

The disclosed traffic system finds potential application at any worksite having multiple simultaneously operating machines. The disclosed system finds particular application at worksites having large, cumbersome, autonomously or remotely controlled machines traveling along interfering routes. The disclosed system may aid in resource allocation and worksite traffic flow of the machines by quantifying congestion in particular areas. Operation of system 30 will now be described in detail with reference to FIGS. 4 and 5.

As shown in FIG. 4, operation of system 30 may begin with worksite controller 38 computing the directed graph of worksite 10 shown in FIG. 5 (Step 400). The directed graph may be computed in any manner known in the art and, although the directed graph is shown visually in FIG. 5, may take any form (e.g., an electronic matrix form). Worksite controller 38 may compute the directed graph based on signals from locating devices 32 that are received via communication devices 34, and also based on assigned routes 18, granted permissions, and corresponding relationships between particular machines 12 and particular lanes within their assigned routes 18.

After computing the directed graph of worksite 10, worksite controller 38 may define a collection of particular lanes within the graph as focus areas (Step 410). In the example of FIG. 5, worksite controller 38 has defined areas $A_1$, $A_2$, and $A_3$ to include lanes $L_1$-$L_8$, $L_9$, and $L_{10}$-$L_{18}$, respectively. It should be noted that the directed graph could be divided into any number of areas located anywhere at worksite 10, as desired. For example, all of worksite 10 could be considered a single area. It should also be noted that a human operator of system 30 could alternatively and manually define the different collections of particular lanes within each area of the directed graph. Following completion of step 410, worksite controller 38 may then detect the connected sub-graphs within each focus area (Step 420). That is, worksite controller 38 may determine the groupings of interconnected machines 12 and lanes. As described above, worksite controller 38 has detected two connected sub-graphs in area $A_1$ of the directed graph of FIG. 5, one connected sub-graph in area $A_2$, and three connected sub-graphs in area $A_3$.

Worksite controller 38 may then count a number of machines 12 within each connected sub-graph (Step 430). For example, worksite controller 38 may determine that there are five machines 12 in the first sub-graph of area $A_1$, and two machines 12 in the second sub-graph. In addition, worksite controller 38 may determine that there is a single machine in area $A_2$. Further, worksite controller 38 may determine that there are four machines 12 in the first sub-graph of area $A_3$, a single machine in the second sub-graph, and three machines in the third sub-graph.

Worksite controller 38 may then compute a "sum of squares" (SS) of the machine counts for each area (Step 440). For example, controller may compute the sum of squares SS for each of areas $A_1$-$A_3$ according to the following three equations Eq. 1, Eq. 2, and Eq. 3 below:

$$SS = \Sigma |5|^2 + |2|^2 = 29 \qquad \text{Eq. 1}$$

$$SS = \Sigma |1|^2 = 1 \qquad \text{Eq. 2}$$

$$SS = \Sigma |4|^2 + |1|^2 + |3|^2 = 26 \qquad \text{Eq. 2}$$

In some embodiments, the sum of squares value SS calculated by worksite controller 38 may be used as a congestion metric. Specifically, as can be seen from equations Eqs. 1-3, a highly congested area (e.g., an area having a higher number of grouping and/or a higher number of interconnected machine and lane nodes within each grouping), will produce a higher sum of squares value SS. Likewise, a lower congested area (e.g., an area having fewer groupings and/or smaller groupings) will produce a lower sum of squares value SS. In the example of FIG. 5, worksite controller 38 has determined that load location 14 is the most congested area, as the sum of squares value SS for area $A_1$ is greatest.

The congestion metric may be used in determining how to control traffic and/or how to allocate resources. In particular, worksite controller 38 may be configured to direct a greater number of machines 12 to a resource (e.g., to load location 14, to dump location 16, or to particular lanes or routes 18) having a lower congestion metric. For example, based on the congestion metric of dump location 16 calculated above, worksite controller 38 may command onboard controllers 36 of some machines 12 originally having routes 18 that lead to load location 14 to instead head toward a different load location 14 (not shown) having a lower sum of squares value SS. Other responsive operations could also or alternatively be implemented based on the congestion metric, including, for example, increasing or decreasing the number of machines 12 in operation, performing maintenance on particular lanes of routes 18, opening up additional dump locations 16, etc.

In other embodiments, the sum of squares value SS may first be normalized (Step 450), before being used to make control changes at worksite 10. For example, the sum of squares value SS may be divided by a total number of machines 12 within each of areas $A_1$-$A_3$ according to the following three equations Eq4., Eq5., and Eq6. below:

$$SS_n = 29/7 = 4.1 \qquad \text{Eq. 4.}$$

$$SS_n = 1/1 = 1 \qquad \text{Eq. 5.}$$

$$SS = 26/8 = 3.25 \qquad \text{Eq. 1.}$$

The disclosed system may provide a way to easily determine congestion of desired areas within a worksite without requiring additional infrastructure. Specifically, the disclosed system may rely on components already normally found on autonomous and remotely controlled machines. This may allow for reduced capital, installation, and maintenance costs.

In addition, the disclosed system may be able to anticipate future congestion problems, and implement responsive operations to avoid or reduce the congestion. In particular, because the disclosed system may rely on known route information (i.e., already assigned lanes that will be followed in the future by each machine 12), the system may be able to anticipate the interconnections between machine and lane nodes when calculating the directed graph, before the interconnections actually occur. This may allow for a change in the interconnections by way of route re-assignment or alterations and, thereby, a proactive reduction in congestion.

It will be apparent to those skilled in the art that various modifications and variations can be made to the traffic system of the present disclosure. Other embodiments will be apparent to those skilled in the art from consideration of the specification and practice of the traffic system disclosed herein. It is intended that the specification and examples be considered as exemplary only, with a true scope being indicated by the following claims and their equivalents.

What is claimed is:

1. A traffic system for use with a plurality of mobile machines at a worksite, the traffic system comprising:
    a locating device positioned onboard each of the plurality of mobile machines and configured to generate a location signal indicative of a location of each of the plurality of mobile machines at the worksite;
    an onboard controller positioned onboard each of the plurality of mobile machines and configured to regulate operation of each of the plurality of mobile machines based on the location signal;
    a communication device positioned onboard each of the plurality of mobile machines; and
    a worksite controller in communication with the locating device and the onboard controller via the communication device, the worksite controller being configured to:
    calculate a directed graph of the worksite based on the location signal and known route assignments for each of the plurality of mobile machines;
    divide the worksite into a plurality of focus areas;
    detect one or more connected sub-graphs within each respective one of the plurality of focus areas in the directed graph;
    count a number of the plurality of mobile machines within each respective one of the connected sub-graphs;
    for each of the respective focus areas, compute a sum of squares value based on the number of the plurality of mobile machines located in each respective one of the connected sub-graphs within the respective focus area;
    determine a congestion metric based on the sum of squares value for a focus area of the plurality of focus areas on the directed graph; and
    selectively command the onboard controller to implement a responsive operation based on the congestion metric.

2. The traffic system of claim 1, wherein the worksite controller is further configured to normalize the sum of squares value for each respective focus area when determining the congestion metric.

3. The traffic system of claim 1, wherein the directed graph includes machine nodes representing the plurality of mobile machines, lane nodes representing lanes in the known route assignments of each of the plurality of mobile machines, and edges extending between the machine and lane nodes representing relationships between the plurality of mobile machines and the lanes.

4. The traffic system of claim 3, wherein the relationships include permission granted relationships, waiting relationships, and blocking relationships.

5. The traffic system of claim 1, wherein the worksite controller is further configured to:
    determine the congestion metric for each of the plurality of focus areas.

6. The traffic system of claim 5, wherein the worksite controller is configured to divide the worksite into the plurality of focus areas by selecting a set of lanes for each focus area, each of the known route assignments consisting of a particular assembly of the lanes.

7. The traffic system of claim 1, wherein the responsive operation includes one of route reassignment and resource allocation.

8. The traffic system of claim 7, wherein the worksite controller is configured to direct a greater number of the plurality of mobile machines to a resource having a lower congestion metric.

* * * * *